US005698292A

United States Patent [19]

Richart et al.

[11] Patent Number: 5,698,292
[45] Date of Patent: Dec. 16, 1997

[54] WRINKLE FINISH POWDER COATINGS

[75] Inventors: Douglas S. Richart, Reading; Charles P. Tarnoski, Sinking Spring, both of Pa.

[73] Assignee: Morton International, Inc., Chicago, Ill.

[21] Appl. No.: 777,678

[22] Filed: Dec. 20, 1996

Related U.S. Application Data

[60] Continuation of Ser. No. 442,046, May 16, 1995, which is a division of Ser. No. 923,088, Jul. 31, 1992, abandoned, which is a continuation-in-part of Ser. No. 866,674, Apr. 10, 1992, abandoned.

[51] Int. Cl.$^6$ ..................................................... C08L 63/00
[52] U.S. Cl. ........................ 428/152; 525/533; 525/526; 525/934
[58] Field of Search ............................ 428/152; 525/533, 525/526, 934

[56] References Cited

U.S. PATENT DOCUMENTS 4,271,277  6/1981  Golownia ................................ 525/519
4,341,819  7/1982  Schreffler ............................... 525/533
5,212,263  5/1993  Schreffler ............................... 525/533

OTHER PUBLICATIONS

ALM, "Formulation Technique Using Triflic Acid Salts" Modern Paints & Coatings, pp. 88–92, Oct. 1980.

Smarsh, "Powder Coating : Why–How–When" J. of Paint Technology, v, 44, No. 565 pp. 30—37, Feb. 1972.

*Primary Examiner*—Robert E. Sellers
*Assistant Examiner*—Patrick R. Delaney
*Attorney, Agent, or Firm*—Robert M. Didrick; Gerald K. White

[57] ABSTRACT

The use of an amine salt of trifluoromethanesulfonic acid as a catalyst for the curing of hydroxyl-functional resins provides a wrinkle finish. The hydroxy-function may be present in polyesters, epoxies, and acrylate or methacrylate resins, among others. The polyester resins which are able to provide such a finish have a hot plate melt flow of at least about 50 mm but if it is more than 150 mm, the gel time of the resin must not be more than about 280 seconds. The minimum gel time in the case of polyesters is about 30 seconds.

6 Claims, No Drawings

WRINKLE FINISH POWDER COATINGS

This is a continuation of co-pending application Ser. No. 08/442,046 filed on May 16, 1995; which is a division of 07/923,088 filed on Jul. 31, 1992, now abandoned; which is a continuation-in-part of 07/866,674 filed on Apr. 10, 1992, now abandoned.

TECHNICAL FIELD

This invention relates to coatings applied by fusion coating processes and more particularly to coating powders that yield wrinkle finishes upon curing. It relates still more particularly to such powders made from thermosettable hydroxy-functional resins.

BACKGROUND OF THE INVENTION

The coating compositions of this invention are dry, free flowing powders that may be used in fusion coating processes. "Fusion coating processes" are herein defined as those coating processes in which a coating powder is distributed over a substrate (which may be hot or cold) and heat, supplied from the substrate or an external source, fuses the powder into a continuous film. Examples of fusion coating processes include fluidized bed, electrostatic spraying, hot flocking, and cloud chambers. When the coating powder is based upon heat curing resins, as is the case of the hydroxy-functional resins of this invention, sufficient heat in excess of that required to fuse the powder must be available to cure the coating and fully develop its physical and chemical properties.

Wrinkle finishes are desired in many applications and are commonly applied to office equipment such as typewriters, staplers, dictating equipment, file cabinets, and the like. In addition to being aesthetically pleasing, these finishes have certain utilitarian functions: they hide surface defects of a substrate even when applied in thin films and, having a low gloss, they do not show scratches. Wrinkle finishes, as contemplated for the purposes of this invention, are reticulated, i.e., made up of a pattern of raised veins across the surface and are exemplified by interconnected star-burst patterns, mosaics, and by patterns similar to that of an alligator hide.

Wrinkle finish coatings conventionally are applied from solvent-based paints, usually using two coats, to establish a compound system in which the surface sets up first. When the rest of the coating cures, the resulting shrinkages deform the previously set surface and cause a fine wrinkle pattern to develop on the surface of the coating.

Epoxy resin-based powder coatings having wrinkle finishes are taught in U.S. Pat. No. 4,341,819. The wrinkle pattern is achieved by means of a special curing agent, methylene disalicylic acid, acting upon the epoxy groups of the resin. Because of the rather poor weatherability of epoxy resin coatings, these wrinkle-finish coatings are used almost exclusively on surfaces protected from the weather and are very popular for interior uses.

SUMMARY OF THE INVENTION

Accordingly, it is the object of this invention to provide a coating powder which will yield a coating having a low gloss and a randomly developed wrinkle pattern on its surface.

It is another object of this invention to provide a coating powder adapted to give a weatherable wrinkle finish.

It is another object of this invention to provide a method for generating a wrinkle finish on a powder coating made from a hydroxy-functional resin.

It is yet another object of this invention to provide a wrinkle finish on an article having a powder coating based on a hydroxy-functional resin.

These and other objects of this invention are achieved through the use of an amine salt of trifluoromethanesulfonic acid as the catalyst for curing a hydroxy-functional resin, the essence of the coating powder.

DETAILED DESCRIPTION OF THE INVENTION

Trifluoromethanesulfonic acid, also known as triflic acid, is one of the strongest of all known monoprotic acids. It is about 427 times as strong as nitric acid but it is not an oxidizing agent and is extremely stable to high temperatures. It is available as FC-28 from the 3M Company. By itself or in an aqueous glycol ether solution, the acid does not act as a wrinkle-producing catalyst in the curing of the powder coating composition on a bare metal surface. However, an amine salt of the acid, called an amine triflate, does cause a remarkably abrupt dulling of the surface of the molten powder and the formation of a skin within seconds of fusion, followed by a slumping of the skin as the resinous mass is cured beneath it. For the purposes of this invention, the meaning of the term amine shall include ammonia as well as amines having the formula $R_xN$ wherein R is an alkyl group, preferably one having from 1 to 4 carbon atoms, and x is from 1 to 3. Examples include methyl-, dimethyl-, and trimethylamine, ethylamine, propylamine, dipropylamine, butylamine, and dibutylamine. The diethylamine salt is a preferred catalyst for the wrinkle-forming curing process of this invention. The amine salts are suitably used as solutions in a mixture of water and a polar organic solvent such as a glycol ether. The diethylamine triflate is available from 3M as FC-520 Resin Catalyst, a 60% solution in a 50/50 mixture of water and diethyleneglycol monoethyl ether. A starburst type wrinkle is achieved with the hydroxy-functional polyester even though the amine triflate has a pH on the order of about 4.5. For an attractive alligator finish on such polyester-based coatings, it is preferred that the pH is from about 6.5 to about 10; an excess of the amine over the stoichiometric amount being used in making the salt alkaline. Nevertheless, the alligator finish is achieved on the epoxy resin-based coatings even when the catalyst does not contain excess amine. When four different lots of FC-520 salt which were effective catalysts for the epoxy alligator finish were diluted with equal amounts of water, the resulting solutions had pH values of 4.7–4.9. In general, then, the pH may be from about 4.5 to about 10 or even higher although a large excess of amine may be harmful to other desirable properties of the coating.

The amount of active catalyst is from about 0.05 to about 1 part per hundred parts by weight of the resin (phr); the term resin herein means the combination of the hydroxy-functional resin and the curing agent. Preferably, the active catalyst is used in an amount ranging from about 0.2 to about 0.8 phr. The types and amounts of filler and pigment used are to be taken into account when determining the level of catalyst for a particular formulation of the coating powder of this invention, as will be seen below.

The curing agent in the coating composition of this invention is preferably one that splits out a volatile by-product of the curing reaction. Aminoplasts, particularly the melamine/formaldehyde resins, urea/glyoxal condensation products, and the alkoxylated derivatives of each are examples of such a curing agent. Hexamethoxymethyl melamine and tetramethoxymethyl glycouril exemplify the preferred curing agents. A curing agent in solid form is preferred for convenience in formulation. The tetramethoxymethyl glycouril, available from American Cyanamid under its trademark and number POWDERLINK 1174, is a solid. The amount of curing agent may be from about 4% to about 20% by weight of the resin, but preferably it is from about 5 to about 7%.

The wrinkle finish powder coatings are derived from hydroxy-functional resins exemplified by hydroxy-functional polyesters, epoxy resins (through the secondary hydroxyl group in each unit), hydroxy-functional acrylate and methacrylate resins, cellulose esters such as cellulose acetate/butyrate, and polyvinylbutyral.

The polyester resin is predominantly hydroxyl in functionality; its acid number is preferably about 12 or less and, even more preferably, not more than about 5. The hydroxyl number, on the other hand, is preferably from about 25 to about 50, as conventionally reported. The amount of curing agent used depends on the hydroxyl number; as the number goes up, so does the amount of curing agent.

The epoxy resins are exemplified by the diglycidyl ether condensation polymers resulting from the reaction of epichlorohydrin with a bisphenol in the presence of an alkaline catalyst. Bisphenol A is most commonly used but the bisphenols B, F, G and H are also suitable. By controlling the operating conditions and varying the ratio of the reactants, products of various equivalent weights can be made. For the purposes of this invention, the epoxide equivalent weight (EEW) may be from about 600 to about 2000 and the hydroxyl equivalent weight may be from about 300 to about 400. These are available from a wide variety of commercial sources. The GT-series of bisphenol A epoxies from Ciba-Geigy, including 7004, 7013, 7014, 7074, and 7097 are examples of useful epoxy resins in this invention. Shell Chemical Co. also supplies suitable epoxy resins under its Epon trademark.

Epoxy/polyester hybrids are also contemplated for use in this invention. The hydroxyl function is contributed by the epoxy resin. Acid functional polyester resins specifically designed for curing with bisphenol A epoxy resins have an acid number of from about 35 to about 75 (equivalent weight about 750–1600) and are generally used at a stoichiometric ratio ±10% with the epoxy. The weight ratio of epoxy to polyester is typically from about 50:50 to about 30:70.

Hydroxy-functional acrylate and methacrylate polymers are exemplified by the homopolymers and copolymers of hydroxyethyl and hydroxypropyl acrylate and methacrylate. Comonomers include alkyl esters of acrylic and methacrylic acid wherein the alkyl group contains from 1 to 8 carbon atoms, styrene, ethylene, propylene, and vinyl monomers. The hydroxyl equivalent weight is from about 600 to about 1400. They are available from the Polymer Division of S.C. Johnson & Son, Inc.

Mixtures of the hydroxy-functional resins are also useful in the practice of this invention.

An essential property that must be considered when formulating a coating powder is the ability of the powder to fuse into a continuous and void free film. As a guide to formulation chemists, two relatively simple test procedures have been established to measure the ability of a coating powder to fuse over a substrate. One of these is gel time which provides a measure of the reactivity of a given system; the other is the hot plate melt flow (HPMF) test which is a combined measure of both the reactivity and melt viscosity of the coating powder. It is generally true that the gel time and the HPMF are a function of the molecular weight and functionality of the resin, the nature of the curing agent, and the activity of the catalyst. The HPMF and melt viscosity are also influenced by fillers which generally increase the viscosity depending on the amount used, the particle size, the surface area and the surface chemistry of the fillers.

For each 100 parts by weight of the resin, from 0 to about 100 parts by weight of fillers and pigments may be added to the formulation. Silica, mica, talc, and diatomaceous earth are examples of the fillers. Alkaline fillers, however, such as the sodium potassium aluminum silicate sold under the MINEX trademark seem to interfere with the catalytic action of the amine triflates. The presence of even a substantially neutral salt like barium sulfate requires an additional amount of the catalyst. Even so, the following pigments exemplify those contemplated in this invention: carbon black, titanium dioxide, nickel-titanium oxide, nickel-antimony-titanium oxide, ferrite yellow oxide, ferric oxides, raw sienna, phthalocyanine blue, phthalocyanine green, ultramarine blue, toluidine red, parachlor red, and organic maroons. Titanium dioxide also interferes to some extent with the catalyst and that is taken into account in formulating the coating composition. The various grades of titanium oxide have varying effects on the appearance of the finish. A very pronounced alligator finish may be obtained on a white coating when an alkaline-reacting titanium oxide having an alumina/silica coating such as that designated R-902 by Dupont is used. Also, titanium oxides by SCM Pigments called Zopaque RCL-2 and RCL-9 permit an alligator finish. An organic-coated titania designated R-101 by Dupont also permits a very desirable finish. On the other hand, an alumina-coated titanium oxide designated R-900 by Dupont greatly slows the cure and an organically treated, silica-encapsulated titanium oxide designated Zopaque RCL-6 by SCM can prevent the formation of a wrinkle finish almost entirely. The effect of R-960 titania (Dupont), which has a silica/alumina coating, on the wrinkle may be minimized by using lesser amounts of the pigment.

Other ingredients may be useful for particular compositions. Flow or leveling agents are useful to promote the formation of a continuous coating. These are exemplified by polyacrylic esters, non-ionic fluorinated alkyl ester surfactants, non-ionic alkylarylpolyether alcohols, and silicones. Benzoin is useful as a bubble release agent.

Melt mixing is the preferred method for making the coating powders. The dry ingredients are weighed into a batch mixer and are mixed with a a medium intensity horizontal plow mixer or a lesser intensity tumble mixer; in the latter case care must be taken that all ingresients are thoroughly distributed. When liquids are to mixed into the powder, a high intensity impeller mixer such as a Henschel or Wellex mixer is advantageous. Mixing times range from about 1 to about 3 minutes for the high intensity mixers to about 30–60 minutes for the tumble mixers. The premix is then further mixed and compounded as the resin is melted in either a single screw or a twin screw extruder for about 0.5 to 1 minute. The extrudate is cooled quickly and broken into small chips suitable for grinding.

The coating powder is applied to substrates by conventional means, including the electrostatic fluidized beds, electrostatic spray guns, and triboelectric guns. Hot flocking may also be used.

ASTM Specification D-3451 defines a procedure for measuring gel time in which a small quantity of powder is dropped onto a hot plate at a given temperature, e.g. 205° C. (400° F.) and stroked with a tongue depressor until continuous and readily breakable filaments are formed when the depressor is lifted from the sample. The elapsed time for this to occur is measured in seconds and is the gel time. Although gel time, by itself, is not an indicator of whether a certain resin composition of this invention will provide a wrinkled finish to the coating made therefrom, the minimum gel time for compositions of this invention is preferably about 30 seconds.

To obtain the desired wrinkle finish, the HPMF of the hydroxy-functional polyester powder coating composition should be at least about 50 but if it is more than 150 mm when measured at 375° F. (190° C.), the gel time must not be greater than about 280 seconds. If these two properties do not fall within these limits, the desired wrinkle finish of this invention is not obtained. In this test a pellet of powder having a diameter of 12.7 mm and 6 mm thick is placed on a hot plate set at 375° F. (190±2° C.) at an inclination angle of 35°. The pellet melts and runs down the plate. The length of the flow is measured in millimeters. The distance the coating flows is dependent on the initial melt viscosity, the rate of reaction, the temperature at which the test is conducted, and the type and amount of catalyst.

As will be seen in the follwing examples, the gel times for the bisphenol A epoxy resins are on the order of about twice those of the hydroxy-functional polyesters whereas the HPMF is about the same order of magnitude.

In the examples of hydroxy-functional polyester coating powders that follow, the correlation between the HPMF, the gel time, and the production of a wrinkle finish is apparent.

EXAMPLES 1-7

Coating powders were prepared in accordance with this invention by initially blending at high speed the POWDER-LINK 1174 curing agent and the polyester resin identified in Table I in weight ratios of 6:94 in Examples 1–4; 8:92 in Example 5; and 10:90 in Examples 6 and 7; along with the following ingredients:

|  | phr |
| --- | --- |
| RESIFLOW P-67 flow agent | 1.4 |
| Benzoin | 0.8 |
| Bartex 65 barium sulfate | 30 |
| Titanium dioxide (R-960) | 0.4 |
| Black pigment | 0.76 |
| Red pigment | 1.5 |
| Yellow pigment | 3.6 |
| Diethylamine triflate (FC-520) | 0.6 |

The blend was then melt-mixed in a Buss extruder whose front zone was maintained at 180° F. and whose rear zone was unheated. The extrudate was then chipped and ground with 0.2% by weight of colloidal alumina (Degussa) to a fine powder that passed through a 60 mesh screen (U.S. Standard).

Precleaned steel test panels (from "Q" Panel Co.) measuring 3"×6"×0.032" (7.6×15.2×0.08 cm) were coated using standard electrostatic spray techniques and baked in an oven at about 400° F. (205° C.) for 15 minutes to give a coating having a thickness of from about 2.5 to about 4.0 mils. The 60° gloss for each panel was 8.2 % or less. Other properties are given in Table I.

TABLE I

| Ex. No. | Polyester Resin* | OH # | Acid # | Visc mPa | Gel time secs | HPMF mm | Wrinkle |
| --- | --- | --- | --- | --- | --- | --- | --- |
| 1 | Arakote 3109 | 30 | — | 4500 | 55 | 87 | Yes |
| 2 | AN 745 | 30 | 5 | 7100 | 41 | 77 | Yes |
| 3 | Ruco 112 | 30 | — | 4500 | 35 | 72 | Yes |
| 4 | Crylcoat 2392 | 30 | — | 6500 | 38 | 54 | Yes |

TABLE I-continued

| Ex. No. | Polyester Resin* | OH # | Acid # | Visc mPa | Gel time secs | HPMF mm | Wrinkle |
| --- | --- | --- | --- | --- | --- | --- | --- |
| 5 | Ruco 121 | 41 | 5 | 4000 | 40 | 74 | Yes |
| 6 | Morton*** | 47 | 12 | 2200 | 39 | 81 | Yes |
| 7** | Morton*** | 47 | 12 | 2200 | 65 | 126 | Yes |

*Arakote 3109 is sold by Ciba-Geigy
AN 745 is sold by Hoechst Celanese
Ruco 112 and 121 are sold by Ruco Polymer Corporation
Crylcoat 2392 is sold by UCB
**Catalyst level reduced to 0.2 phr
***Captive product of assignee; not commercially available

COMPARATIVE EXAMPLES A–D

The general procedures of Example 1 were repeated except for the substitution of the polyester resins shown in Table II for that of Example 1. As is shown in the table, none of these powder coating compositions produced a wrinkle finish. The weight ratios of curing agent to resin were 6:94 for Examples A,B, and E; and 8:92 for Examples C & D.

TABLE II

| C. Ex. | Polyester Resin | OH # | Acid # | Visc mPa | Gel time secs | HPMF mm | Wrinkle |
| --- | --- | --- | --- | --- | --- | --- | --- |
| A | Ruco 111 | 23 | 4 | 6500 | 24 | 49 | No |
| B | Crylcoat 3493 | 30 | — | — | 29 | 46 | No |
| C | Ruco 118 | 41 | 13 | 7500 | 25 | 28 | No |
| D | XP 3932 | 40 | 13 | 4000 | 29 | 46 | No |
| E* | Arakote 3109 | 30 | — | 4500 | 298 | 150+ | No |

*Formulation contained only 0.1 phr of the FC-520 catalyst and 50 phr of barium sulfate

COMPARATIVE EXAMPLES F–Q

Here, the general procedures of Example 1 were followed except for the substitution of the catalysts shown in Table III. As shown, none of these other catalysts, including cyclamic acid, provided a fused coating having a wrinkle finish.

TABLE III

| C. Ex. | Catalyst* | Type | Gel time secs. | HPMF mm | Wrinkle |
| --- | --- | --- | --- | --- | --- |
| F | Nacure 4167 | phosphate | 300+ | 150+ | No |
| G | Nacure 5225 | dodecyl-benzene sulfonic acid salt | 79 | 88 | No |
| H | Nacure 3525 | dinonyl-naphthalene disulfonic acid salt | 66 | 77 | No |
| J | Nacure 2500 | p-toluene sulfonic acid salt | 54 | 79 | No |
| K | Nacure XP330 | zinc salt of dinonyl-naphthalene sulfonic acid | 31 | 39 | No |
| L | Nacure XP350 | sulfonic acid ester | 69 | 61 | No |
| M | Cycat 4045 | amine blocked | 54 | 79 | No |

TABLE III-continued

| C. Ex. | Catalyst* | Type | Gel time secs. | HPMF mm | Wrinkle |
|---|---|---|---|---|---|
| N | Cycat 4040 | aromatic sulfonic acid strong acid | 25 | 26 | No |
| O | Cycat 600 | organic acid | 22 | 18 | No |
| P | Cycat 296-9 | acid | 300+ | 54 | No |
| Q | Cyclamic acid | — | 40 | 57 | No |

*Nacure is a trademark of King Industries
Cycat is a trademark of American Cyanamid
Cyclamic acid is a product of Abbott Laboratories

EXAMPLES 8–14

The general procedure of Examples 1–7 was repeated except that benzoin was not used, 40 parts of the Bartex 65 filler was used, only 0.5 part of the amine triflate was used, and the epoxy resin identified in Table V was used. The weight ratio of the resin to the Powderlink 1174 curing agent is also given in the table.

TABLE V

| Ex. No. | Epoxy Resin | Ratio | eq wt (OH) | epoxy eq wt | Gel time secs | HPMF mm | Wrinkle |
|---|---|---|---|---|---|---|---|
| 8 | GT-7013* | 6:94 | ~400 | 650–725 | 300+ | 67 | yes |
| 9 | GT-7074* | 7:934 | 323 | 950– | 130 | 56 | alligator |
| 10 | GT-7074* | 8:92 | 323 | 950–1175 | 134 | 55 | alligator |
| 11 | GT-7097* | 8:92 | 303 | 1667–2000 | 104 | 56 | alligator |
| 12 | GT-7097* | 9:91 | 303 | same | 82 | 59 | alligator |
| 13 | GT-7097* | 10:90 | 303 | same | 88 | 61 | alligator |
| 14 | Epon 2004** | 6:94 | ~325 | 875–975 | 300+ | 63 | yes |

*Ciba-Geigy
**Epon is a trademark of Shell Chemical Co.
poor cure

EXAMPLE 15

Ruco 112 polyester (94 parts), Powderlink 1174 curing agent (6 parts), Resiflow P-67 and Uraflow B flow agents (1.4 and 0.8 parts, respectively), Bartex 65 filler (40 parts), Raven #22 carbon black (3 parts), and the dibutylamine salt of triflic acid (0.4 part, pH=9.3) were blended in a Henschel blender at 2200 rpm for 1 minute. The blend was then melt mixed in an extruder having a front zone at 180° F. and an unheated rear zone. The extrudate was then mixed with 0.2% by weight of alumina "C" and ground in a high speed, 12 pin grinder to a 60 mesh size. The gel time of the resulting coating powder was 99 seconds and the HPMF was 92 mm. A Q-panel electostatically coated with about 2.5 to 4.0 mils of the powder was heated at 400° F. for 15 minutes. A wrinkle finish was achieved.

EXAMPLE 16

The general procedure of Example 15 was repeated except that the pH of the dibutylamine salt was 8.3. A wrinkle pattern substantially identical to that of Example 15 was achieved.

The subject matter claimed is:

1. An article having a wrinkle finish coating comprising a cured powder coating composition comprising a hydroxy-functional resin, an aminoplast condensation product as a curing agent, and from about 0.05 to about 1 part per hundred parts by weight of the combined weight of the resin and the curing agent, and an amine salt of trifluoromethane-sulfonic acid as a catalyst.

2. The article of claim 1 wherein the curing agent is an alkoxylated aminoplast.

3. The article of claim 1 wherein the catalyst is the diethylamine salt.

4. The article of claim 1 wherein the resin is a polyester.

5. The article of claim 1 wherein the resin is an epoxy resin.

6. The article of claim 1 wherein the resin is an acrylate or methacrylate resin.

* * * * *